United States Patent
Zumbach

(10) Patent No.: US 11,160,209 B2
(45) Date of Patent: Nov. 2, 2021

(54) HYDRAULIC DRIVE ARRANGEMENT TO DRIVE A RECIPROCATING CUTTER BAR

(71) Applicant: Deere & Company, Moline, IL (US)

(72) Inventor: Ferdinand Zumbach, Zweibruecken (DE)

(73) Assignee: Deere & Company, Moline, IL (US)

( * ) Notice: Subject to any disclaimer, the term of this patent is extended or adjusted under 35 U.S.C. 154(b) by 118 days.

(21) Appl. No.: 16/393,345

(22) Filed: Apr. 24, 2019

(65) Prior Publication Data

US 2019/0357438 A1 Nov. 28, 2019

(51) Int. Cl.
| | |
|---|---|
| *A01D 41/14* | (2006.01) |
| *A01D 34/14* | (2006.01) |
| *A01D 69/00* | (2006.01) |
| *A01D 34/135* | (2006.01) |
| *A01D 34/38* | (2006.01) |
| *A01D 69/06* | (2006.01) |
| *A01D 34/34* | (2006.01) |
| *A01D 34/30* | (2006.01) |

(52) U.S. Cl.
CPC ......... *A01D 41/142* (2013.01); *A01D 34/135* (2013.01); *A01D 34/34* (2013.01); *A01D 34/38* (2013.01); *A01D 69/005* (2013.01); *A01D 69/06* (2013.01); *A01D 34/145* (2013.01); *A01D 34/30* (2013.01); *A01D 41/148* (2013.01)

(58) Field of Classification Search
CPC ...... A01D 34/08; A01D 41/142; A01D 34/02; A01D 34/10; A01D 34/135; A01D 34/13; A01D 34/30; A01D 34/38; A01D 34/03; A01D 69/06; A01D 69/00; A01D 69/03; A01G 2003/0461; A01G 3/04–053; B27B 11/06; B27B 11/08; B27B 11/10; B27B 11/12; B27B 19/00; B27B 19/006; B27B 19/02; B27B 19/04; B27B 19/10; B27B 19/12; B26D 5/08–18
See application file for complete search history.

(56) References Cited

U.S. PATENT DOCUMENTS

| | | | |
|---|---|---|---|
| 2,569,507 A | 10/1951 | Von Schlegell | |
| 3,246,528 A * | 4/1966 | Kosch | A01D 34/38 74/50 |
| 3,517,494 A * | 6/1970 | Beusink | A01D 34/30 56/293 |

(Continued)

FOREIGN PATENT DOCUMENTS

| | | |
|---|---|---|
| DE | 273570 A1 | 11/1989 |
| DE | 20019332 U1 | 3/2001 |

(Continued)

OTHER PUBLICATIONS

European Search Report issued in counterpart European Patent Application No. 19176225.1 dated Nov. 11, 2019 (6 pages).

*Primary Examiner* — Alicia Torres
*Assistant Examiner* — Madeline Ivy Runco

(57) ABSTRACT

A drive arrangement for the reciprocating drive of a cutter bar comprises a hydraulic gear motor with a housing and a gearwheel, which is set in motion around a first axis by a hydraulic medium, and an eccentric drive, which comprises an eccentric element that can be rotatably driven by a gearwheel around a second axis parallel to the first axis, and a drive element connected to the eccentric element, which is, or can be, connected to the cutter bar.

11 Claims, 4 Drawing Sheets

(56) References Cited

U.S. PATENT DOCUMENTS

| | | | |
|---|---|---|---|
| 3,577,716 A | 5/1971 | McCarty et al. | |
| 3,918,857 A * | 11/1975 | Fitzgerald | F16L 55/04 418/73 |
| 3,973,378 A * | 8/1976 | Bartasevich | A01D 34/37 56/11.9 |
| 4,067,179 A * | 1/1978 | Schneider | A01D 34/30 56/297 |
| 4,446,683 A * | 5/1984 | Rempel | A01D 34/13 56/16.2 |
| 4,813,291 A * | 3/1989 | Schumacher, II | A01D 34/30 384/434 |
| 4,866,921 A * | 9/1989 | Nagashima | A01D 34/30 56/257 |
| 5,010,717 A * | 4/1991 | Nakamura | A01D 34/30 56/17.6 |
| 5,189,867 A * | 3/1993 | Schmidt | A01D 44/00 56/10.3 |
| 5,430,998 A * | 7/1995 | Albrecht | A01D 34/831 56/290 |
| 5,497,605 A | 3/1996 | Underwood et al. | |
| 6,698,177 B1 * | 3/2004 | Akehi | B21D 53/28 56/236 |
| 6,889,492 B1 * | 5/2005 | Polk | A01D 34/30 56/257 |
| 7,082,742 B2 | 8/2006 | Schrattenecker | |
| 7,121,074 B1 * | 10/2006 | Regier | A01D 34/305 56/296 |
| 7,708,664 B2 * | 5/2010 | Schumacher | A01D 34/30 475/11 |
| 7,730,702 B2 | 6/2010 | Mortier et al. | |
| 8,011,272 B1 * | 9/2011 | Bich | A01D 34/305 74/595 |
| 9,357,696 B2 * | 6/2016 | Ritter | A01D 34/145 |
| 9,357,697 B2 * | 6/2016 | Surmann | A01D 34/145 |
| 2009/0145097 A1 | 6/2009 | Priepke | |
| 2017/0094898 A1 * | 4/2017 | Schumacher | A01D 34/30 |
| 2017/0105344 A1 * | 4/2017 | Webermann | A01D 34/30 |
| 2018/0093564 A1 * | 4/2018 | Long | A01D 69/025 |

FOREIGN PATENT DOCUMENTS

| | | | |
|---|---|---|---|
| DE | 102004037580 A1 | 3/2006 | |
| DE | 102013208957 A1 | 11/2014 | |
| DE | 102016212646 A1 | 1/2018 | |
| EP | 1653122 A1 | 5/2006 | |
| EP | 2382852 A2 | 11/2011 | |
| EP | 2700294 A2 | 2/2014 | |
| WO | WO-2012166666 A1 * | 12/2012 | A01D 34/30 |

* cited by examiner

HYDRAULIC DRIVE ARRANGEMENT TO DRIVE A RECIPROCATING CUTTER BAR

Priority is claimed to German Patent Application No. 102018208169.7, filed 24 May 2018, the entirety of which is hereby incorporated by reference herein.

FIELD OF THE DISCLOSURE

The present disclosure relates to a drive arrangement for the reciprocating drive of a cutter bar.

BACKGROUND OF THE DISCLOSURE

Cutter sections are used when harvesting cultivated plants in order to cut off the plants, bring them together and feed them to a harvester, where they are processed and, in particular, threshed (combine harvester) or foraged (forage harvester). As a rule, such cutter sections comprise a front cutter bar to cut off the plants, a reel positioned above the cutter bar, in order to take the tips of the plants to the back, and a cross conveyor with a feed screw or belts, which brings together the harvested plants at the side in order to feed them to an inclined elevator on the combine harvester by use of center fingers on the screw or a reverse conveyor belt through a rear wall located in a rear wall of the cutter section or to a feed channel of the forage harvester to produce whole-crop silage. At the side ends of the cutter section, side walls are provided, between which the cutter bar and the cross-conveyor screw extend. The base of the cutter section between the cutter bar and the rear wall is formed by a base plate described as a cutting table.

In order to adjust to different types of harvested produce and, hence, to plant sizes, cutter sections with adjustable length cutting tables are used. Particularly for harvesting rape, the cutting table is pulled out forward (and supplemented by side blades), while for harvesting shorter plants forming dense bushes (unlike rape), such as wheat, it is pulled in backward.

In the case of cutter sections in particular, with length-adjustable cutting tables, but also in the case of cutter sections that are not length-adjustable, the drive for the cutter bar proves to be relatively complicated because the drive moment of the combine harvester has to be transferred right forward to the cutter bar. In the current state of the art, the cutter bar drive is usually provided by a drive belt, which is located at a side end of the cutter section, and the forward drive moment provided by the combine harvester is transmitted to a gear, which converts the rotary motion into the linear reciprocal motion of the cutter bar by use of an eccentric drive (see DE 10 2004 037 580 A1 for a rigid cutter section or EP 1 653 122 A1 for a cutter section with length-adjustable table), or the drive belt is replaced by a telescopic universal shaft (EP 2 700 294 A2).

In the case of cutter section widths of larger working widths, it is useful to divide the cutter bar into two sections, which are driven in opposite phase, in order to cancel out the oscillations caused by the reciprocating motion of the cutter bar. The drive for the cutter beam halves can be provided in each case by one end of the cutter section by use of an allocated gear, the outputs of which are mutually phase-offset by 180° (U.S. Pat. No. 3,577,716 A), or by use of a gear starting from the middle of the cutter section, said gear having a crankshaft, which drives two phase-offset outputs (U.S. Pat. No. 5,497,605 A). Other drives, positioned in the middle of the cutter section, use eccentric drives driven by planetary gears in order to convert the rotary motion of a hydromotor or a universal shaft into the lateral motion of the two cutter bar halves (EP 2 382 852 A2). The input shaft, driven by the universal shaft or hydromotor, is horizontal and extends backward from the gear so that the rotary motion within the gear initially has to be converted by a bevel gear into the rotation of the planetary gear around the vertical axis, which has the disadvantage that the gear has relatively large vertical dimensions. However, within a cutter section, i.e. under the cutting table, there is only limited space available for the gear, particularly in the vertical direction.

DE 200 19 332 U1 describes a side cutter section that is fitted to one side end of a cutter section for harvesting rape. It comprises a hydromotor, which is flange-mounted on a housing, which contains a bearing for the hydromotor shaft. On the side of the housing facing away from the hydromotor, an eccentric drive is fitted, which is used to drive the blades of the side cutter section. Here too, there is a relatively large overall length in the forward direction, because the hydromotor with its own housing, the housing with the bearing and the eccentric drive are axially arranged one behind the other and are assembled separately from one another.

In cutter sections, radial piston motors characterized by relatively large axial dimensions are usually used as hydromotors to drive the cutter bar. Hitherto, the use of a hydraulic gear motor to drive a cutter bar has only been described in a swather (DD 273 570 A1), without any details being mentioned of how the motor is coupled to the cutter bar.

SUMMARY OF THE DISCLOSURE

Particularly (but not only) in the case of cutter sections with length-adjustable cutting tables, there is only relatively limited vertical space available in the middle of the cutter section where a gear can be fitted in order to convert the incoming rotary motion into the lateral motion of the two cutter beam halves. The crankshaft in U.S. Pat. No. 5,497,605 A, however, requires a relatively large overall vertical space, which also applies to the bevel gear in EP 2 382 852 A2. It may thus be desirable to address a cutter bar drive arrangement that is characterized by small dimensions in the direction running across the level of the cutter bar.

A drive arrangement for the reciprocating drive of a cutter bar comprises a hydraulic gear motor with a housing and at least one gearwheel located in the housing, said gearwheel being set in motion around a first axis by a hydraulic medium. The drive arrangement comprises an eccentric drive connected to the gear motor in a drive arrangement. The eccentric drive comprises an eccentric element that can be rotated by the gearwheel around a second axis that is parallel to the first axis, and a drive element coupled to the eccentric element, which can be or is coupled in a driving arrangement to the cutter bar.

In other words, a relatively flat, hydraulic gear motor is used in order to set an eccentric drive in rotation, which, for its part is connected to the cutter bar in a drive arrangement. Because the axes of rotation of the gear motor and eccentric drive are parallel or even coaxial in relation to one another, no angular gear is provided in order to transmit the drive moment of the gear motor to the eccentric drive. Accordingly, we obtain a compact design of the drive arrangement that is very flat in an axial direction and which is very easily integrated into a cutter section.

The eccentric element can be connected to the gearwheel either directly or via a planetary gear. In the first case, the drive arrangement is very simple and it is possible to adapt the output speed of the drive arrangement by making the diameter of the gearwheel sufficiently large and/or reducing the transmission ratio in the drive train between the eccentric element and the cutter bar to the current requirements with respect to the cutting frequency of the cutter bar. In the second case, the speed of the gearwheel is reduced by the planetary gear in order to meet said requirements.

The planetary gear can comprise a ring gear connected directly to the gearwheel, a sun gear rigidly connected to the housing and a planetary carrier carrying planetary gears, said planetary carrier being connected to the eccentric element.

The housing can comprise a base, a rim enclosing the gearwheel and a cover with a circular opening. A ring connected to the gearwheel may extend through the opening and a seal may be arranged between the rim of the opening and the ring. Accordingly, the inside of the housing is sealed to the outside by the housing, the ring and the seal.

In one possible embodiment, the gear motor comprises only one single gearwheel, the rotation of which around the first axis can be achieved by suitable measures (executed as a so-called internal gear or rotary motor). Such a drive arrangement can drive a single cutter bar. In another embodiment, however, the gear motor comprises a further gearwheel located inside the housing, which meshes with the first gearwheel and can be set in rotation around a third axis by the hydraulic medium, while a further eccentric drive, in a drive arrangement with the gear motor, is provided, said eccentric drive comprising a further eccentric element that can be rotated by the further gearwheel around a fourth axis parallel to the third axis and a drive element connected to it, which can be connected in a drive arrangement to a further cutter bar. The hydraulic gear motor is accordingly executed as a so-called external gear motor, the gearwheels of which mesh in the middle of the gear motor (more or less fluid-tight) and are driven on the outsides by the hydraulic flow. The eccentric element and the further eccentric element can be offset by 180° so that the two cutter bars can be driven in opposing phase. The details of the drive train and housing mentioned above can also be applied to the further gearwheel and further eccentric element, so that the drive arrangement can be executed symmetrically in relation to its center longitudinal axis. The drive arrangement described with the drive elements driven in opposing phase, can be fitted in the middle of a cutter section or, if necessary, laterally offset in relation to the middle. It is also conceivable to separate the cutter bar into four or six or more parts and to drive two parts in each case by a drive arrangement described, located close to the separation point between adjacent parts.

The drive arrangement can be applied to a cutter section, which can be driven by a frame that can be moved forward over a field, on the front of which a cutter bar is mounted so that it can be moved laterally and which can be driven by the drive arrangement. At the front, two cutter bars in particular are laterally offset in relation to one another, of which one can be driven by the eccentric element and the other by the further eccentric element. It would also be conceivable to use the drive arrangement in vertical side blades for harvesting rape, either in a rape cutter section attachment or in detachable side blades of a length-adjustable cutter section. As indicated above, the drive arrangement in this case can also drive one or two cutter bars, with the latter, in particular, in counter-phase.

The present drive arrangement is particularly suited to cutter sections with length-adjustable cutting tables, where a front cutter section part is adjustably arranged in relation to a rear cutter section part. In cutter sections of this type, the drive arrangement and the cutter bar are supported on the front cutter section part. A flexible line supplies the gear motor with hydraulic fluid under pressure. However, the drive arrangement can also be used on any other types of cutter sections, for example with non-length adjustable cutting table or with conveyor belts instead of screws for conveying away harvested produce. The cutter beam may be rigid or flexible (ground copying). The cutter section can also be used simply for cutting and, if necessary, swathing harvest produce and may, for example, be used on swathers or cutting vehicles.

The cutter section can be used on any self-driving harvesters, such as combine harvesters or forage harvesters or cutting vehicles.

BRIEF DESCRIPTION OF THE DRAWINGS

The drawings show two embodiments described in greater detail below.

DETAILED DESCRIPTION OF THE DRAWINGS

Figures 1, 2:
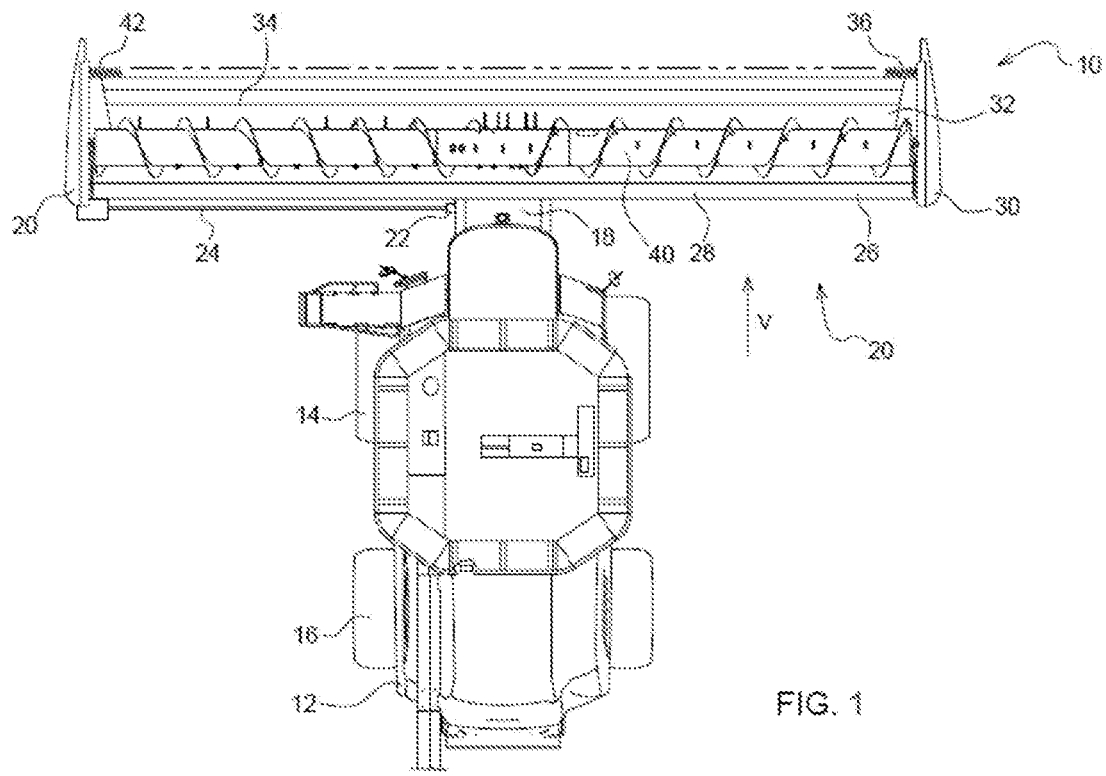
FIG. 1 shows a top view of a combine harvester with attached cutter section.
FIG. 2 shows a perspective view of the middle sections of the cutter bars of the cutting section in FIG. 1, with a reciprocal drive arrangement.

FIG. 1 shows a self-driving harvester 10 in the form of a top view of a combine harvester. The harvester 10 comprises a body 12 supported on drivable, front wheels 14 and steerable rear wheels 16, said body, which during harvesting, is moved in a forward direction V across a field, said forward direction extending to the left in FIG. 1. At its front end, the body 12 carries an inclined elevator 18, at the front end of which a removable cutter section 20 is again attached. The inclined elevator 18 comprises a driven power take-off shaft 22, to which an input shaft 24 for driving driven components of the cutter section 10 is detachably connected. During harvesting, the cutter section 20 cuts the harvest produce of a field, picks it up and takes it to the inclined elevator 18, which conveys it to the inside of the body 12, where it is threshed, separated and cleaned. Finally, the clean grain is deposited in a grain tank from which it can be transferred to a transport vehicle.

The cutter section 20 is retractable and comprises a rear section 26 with side walls 30 and a cross-frame 28, which is fitted to the inclined elevator 18 and a front section 32 with a base plate 34 and two cutter bars 36 and 42. The front section 32 with the base plate 34 and the cutter bars 36, 42 can be moved backward and forward in relation to the rear section 26 in the forward direction V by hydraulic actuators, not shown. The rear section 26 also comprises a transverse screw conveyor 40 and a reel, not shown. Since adjustment mechanisms of the cutter section are well known per se (see DE 10 2013 208 957 A1, U.S. Pat. No. 7,082,742 B2 and U.S. Pat. No. 7,730,702 B2) more detailed discussions are dispensed with here.

The transverse screw conveyor 40 and the reel, if applicable, are driven by the input shaft 24, which extends crosswise over the rear side of the cutter section 20, said input shaft 24 extending outward from the power take-off shaft 22, to the left side wall 20.

FIG. 2 shows in detail how the cutter bars 36, 42 are driven. The drive arrangement comprises a drive 38 with a housing 44 and eccentric elements 46, 48 supported thereon, which are connected to a drive train in a drive arrangement with the cutter bars 36, 42 via a drive element in the form of coupling rods 62, 64. The eccentric elements 46, 48, as described in greater detail below, are hydraulically driven, for which the housing 44 comprises an inlet 50 and an outlet 52 and, in each case, they counter-rotate around axes 54, 56, which are orientated perpendicularly to the base plate 34.

A first, straight coupling rod 64 can be rotatably coupled to the eccentric element 46 around an axis 58 that runs parallel to axis 54, and pivotably coupled (and roughly centrally in the forward direction V) to an initial output element 68, around an axle 90 which runs parallel to axis 54, said output element 68, for its part, being pivotably coupled to the left cutter bar 42 around an axle 104 running parallel to axis 54 or rigidly coupled, either directly or via connecting elements 102 located in between, to the left cutter bar 42. The coupling rod 64 extends transversally to the left in relation to the forward direction V. An initial lever 74 is pivotably connected to a rear end of the Y-shaped output element 68 around an axle 82 running parallel to axis 54 and at the other end is pivoted in relation to the base plate 34 around an axle 86 running parallel to axis 54. The initial lever 74 extends to the front and right from the axle 82. A second lever 76 is pivotably connected to the other rear end of the output element 68 around an axle 80 that runs parallel to axis 54 and, at the other end, is pivoted in relation to the base plate 34 around an axle 84 running parallel to axis 54. The second lever 76 extends to the front and left from the axle 80. Both levers, 74, 76 are of equal length and are positioned symmetrically in relation to each other around the longitudinal axis of the output element 68.

A second, angled coupling rod 62 is pivotably coupled to the eccentric element 48 around an axis 60 running parallel to axis 56 and pivotably connected to a second output element 66 around an axle 100 that runs parallel to axis 54, said axle 100 being located in a forward direction V at the same level as axle 90 (and roughly centrally on the output element 66 in forward direction V), said output element 66 for its part being pivotably coupled around axle 108 that runs parallel to axis 56, or is rigidly coupled, either directly or indirectly via connecting elements 106 arranged in between, to the right cutter bar 36. A third lever 70 is pivotably connected around an axle 92 running parallel to axis 56 to a back end of the Y-shaped output element 66 and, at the other end, is pivoted in relation to the base plate 34 around axle 98 running parallel to axis 56. A fourth lever 72 is pivotably connected around axle 94, which runs parallel to axis 56, to the other rear end of the output element 66 and, at the other end, is pivoted in relation to the base plate 34 around axle 96 running parallel to axis 56.

Axles 84, 86, 96 and 98 and the housing 44 may be attached to the base plate 34 or to any other support element, which in turn is attached to the front section 32. Axles 90, 82, 80, 94, 92 and 100 in each case only connect two moving components and are not directly attached to the base plate 34 or to the supporting element mentioned, which supports axles 84, 86, 96 and 98. The output elements 66, 68 can be triangular or Y-shaped as shown in FIG. 2. The third lever 70 extends forward and to the right from axle 92. The fourth lever 72 extends forward and to the left from axle 94. Both levers, 70, 72 are of equal length and are positioned symmetrically in relation to each other around the longitudinal axis of the output element 66. The drive arrangements and drive 38 are located under the base plate 34 and can be protected from underneath by a cover. The cutter bars 36 and 42 are mounted on the front section 42 so they can be moved to the side at a distance from the output elements 66, 68, for which known linear bearings can be used or other arrangements according to FIG. 2, which are not, however, actively driven.

Accordingly, the coupling rods 62, 64 and the output elements 66, 68 transmit the eccentric rotary motion of the eccentric elements 46, 48 into at least approximately linear movements of the cutter bars 36, 42, for which detailed reference is made to the disclosure of DE 10 2016 212 646 A1, which is included in the present documents by reference. The drive train shown in FIG. 2, however, only shows a preferred embodiment and may be replaced by any other drive train, for example couplings rods 62, 64 linked directly to the connecting elements.

Figure 3:
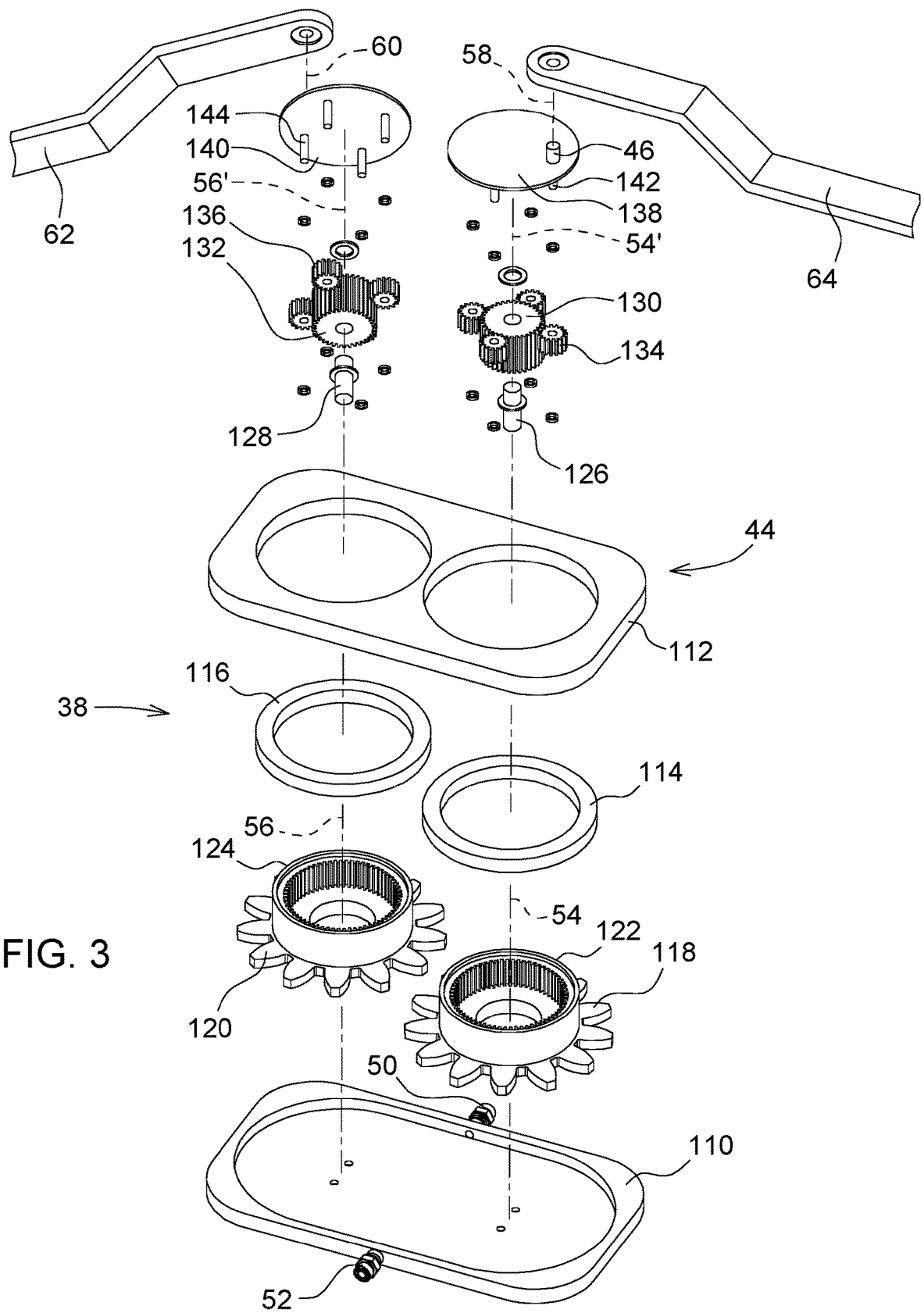
FIG. 3 shows an exploded view of the drive arrangement in FIG. 2.
Figure 4:
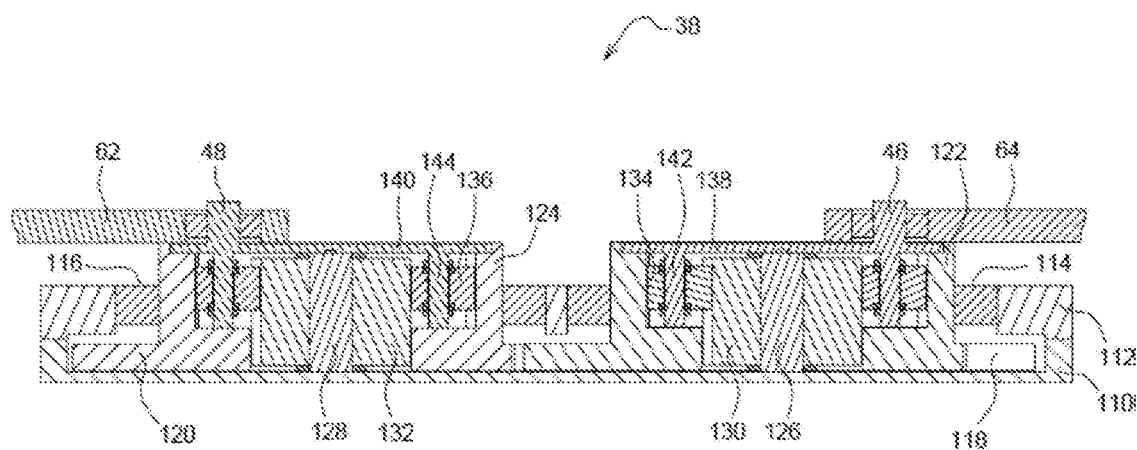
FIG. 4 shows a section through the drive arrangement in FIG. 2 along the line 4-4 in FIG. 2.

The structure of the drive 38 is shown in detail in FIGS. 3 and 4. The housing 44 comprises a base 110 with an outer, raised rim, within the vertical dimensions of which two gearwheels 118, 120 are accommodated. Gearwheels 118, 120 intermesh and are set in opposing rotation by the hydraulic flow, which runs along the outsides of the gearwheels 118, 120 from the inlet 50 to the outlet 52 (which can also be reversed), while only a little or no hydraulic fluid can flow through the areas where the gearwheels 118, 120 mesh. Rings 122, 124, which extend upward, are connected to or are produced in one piece with the gearwheels 118, 120, the outer circumference of which is circularly cylindrical and in cooperation with radial seals 114, 116, made from flexible material, and complementary holes in the cover 112, the housing 44 and the gearwheels 118, 120 it contains, are sealed to the outside.

A flexible line, not shown, supplies the gearwheels 118, 120 of the gear motor from the combine harvester 10 via a separable coupling and the rear cutter section 26 with hydraulic fluid under pressure. However, instead of this, a pump could be provided at the front or back of the cutter section 26, 32, which is driven by the input shaft 24, to supply the gear motor.

Rings 122, 124 are internally toothed and serve as a ring gear for planetary gears, which each comprise a sun gear 130, 132 and planetary gears 134. The sun gears 130, 132 in each case are non-rotatably connected to the base 110 by axles 126, 128. The planetary gears 134, 136 that mesh with the sun gears 130, 132 and the ring gear of rings 122, 124 are rotatably supported by locking pins 142, 144 on a planetary gear carrier 138, 140 executed as a top cover. An eccentric element 46, 48 is attached in each case to the top of the planetary gear carrier 138, 140.

Figure 5:
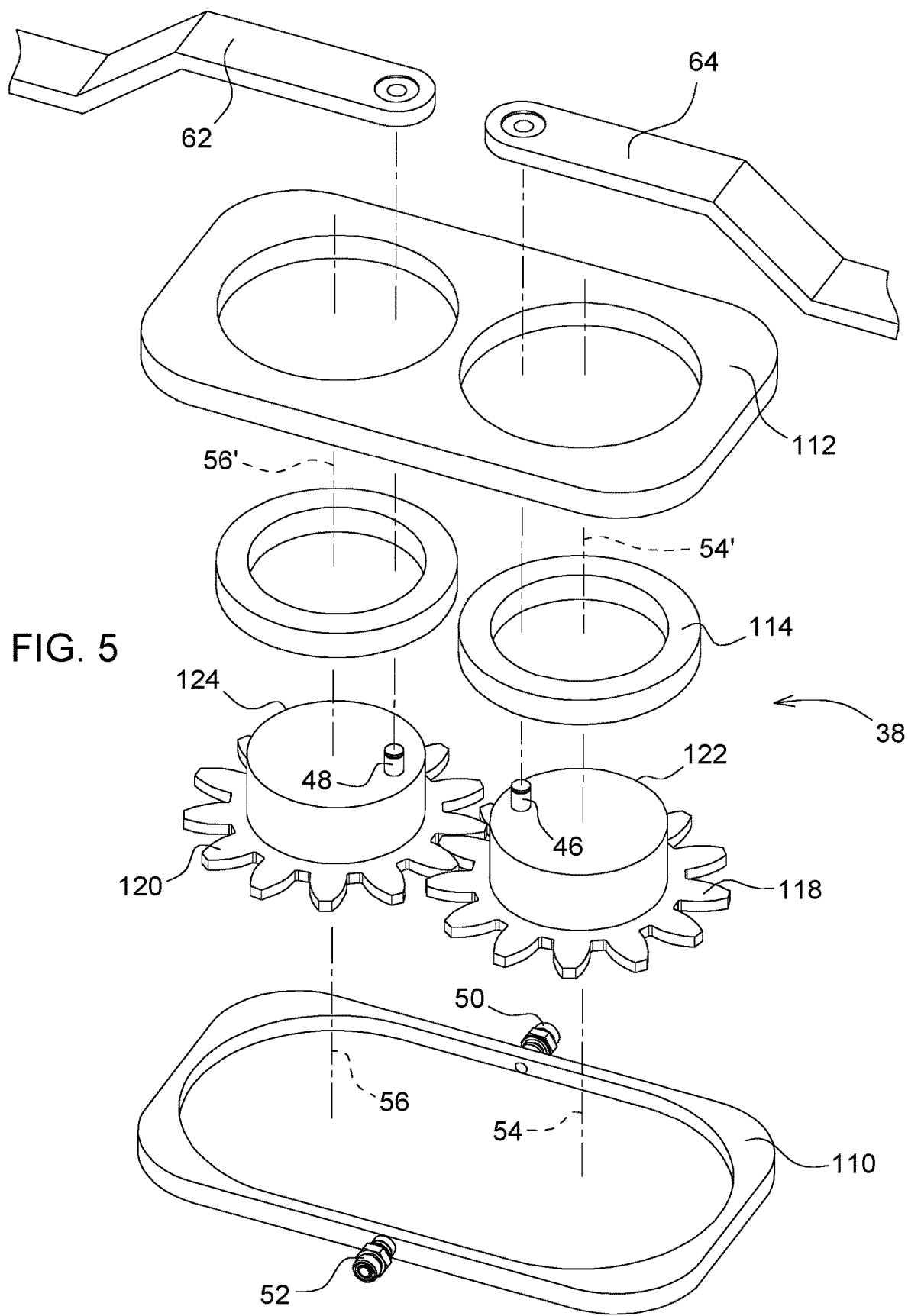
FIG. 5 shows an exploded view of a second embodiment of a drive arrangement.

In the second embodiment shown in FIG. 5, there are no planetary gears, and the eccentric elements 46, 48 are fitted directly to the gearwheels 118 or the rings 122, 124 or to a cover attached on top.

After all this, it can be seen that by using a hydraulic gear motor with gearwheels 118, 120, which rotate around a first and third axis 54, 56, and the eccentric drive with the eccentric element (planetary gear carriers 138, 140 in FIGS. 3 and 4 and/or gearwheel 118, 120 or ring 122, 124 or its cover in FIG. 5), itself rotating around the second and fourth axis 54', 56', it is possible to achieve a very flat design for the drive 38.

What is claimed is:

1. A drive arrangement for the reciprocating drive of a cutter bar, comprising:
   a hydraulic gear motor with a housing and two gearwheels located in the housing, in which the gearwheels intermesh and are set into rotation in opposite directions by a hydraulic medium running along outsides of the gearwheels from an inlet to an outlet of the housing, while only a limited or no amount of the hydraulic medium flows through an area where the gearwheels intermesh, such that one of the gearwheels is set in motion around a first axis by the hydraulic medium, and an eccentric drive connected to the gear motor to be driven thereby, the eccentric drive comprising an eccentric element that is rotatably driven by one of the gearwheels around a second axis parallel to the first axis and a drive element connected to the eccentric element, which is, or can be, drivingly connected to the cutter bar;

wherein one of the gearwheels is a first gearwheel, the eccentric drive is a first eccentric drive, the eccentric element is a first eccentric element, and the cutter bar is a first cutter bar, the gear motor further comprises a second gearwheel, which is the other one of the gearwheels, located within the housing, the second gearwheel is set in motion around a third axis by the hydraulic medium, further comprising a second eccentric drive connected to the gear motor to be driven thereby, wherein the second eccentric drive comprises a second eccentric element rotatably driven by the second gearwheel around a fourth axis parallel to the third axis and comprising a second drive element connected to the second eccentric element, which is, or can be, drivingly connected to a second cutter bar.

2. The drive arrangement according to claim 1, wherein the second axis is coaxial with the first axis.

3. The drive arrangement according to claim 1, wherein the eccentric element is connected either directly or via a planetary gear to one of the gearwheels.

4. The drive arrangement according to claim 3, wherein the planetary gear comprises a ring gear directly connected to one of the gearwheels, a fixed sun wheel connected to the housing and a planet carrier supporting planetary gears, the planet carrier being connected to the eccentric element.

5. The drive arrangement according to claim 1, wherein the housing comprises a base, a rim enclosing one of the gearwheels and a cover with a circular opening, a ring connected to one of the gearwheels that extends through the opening and a seal arranged between the rim of the opening and the ring.

6. The drive arrangement according to claim 1, wherein the first eccentric element and the second eccentric element are offset at an angle of 180°.

7. A cutter section with a frame that is moveable in a forward direction over a field, on a front of said frame is located the first cutter bar, which is mounted so that it can be moved in a lateral direction and that can be driven by the drive arrangement according to claim 1.

8. The cutter section according to claim 7, wherein the cutter section comprises a second cutter bar, the first and second cutter bars are arranged at the front of the cutter section so as to be laterally offset, the first cutter bar can be driven by the first eccentric element, and the second cutter bar can be driven by the second eccentric element.

9. A combine harvester with a cutter section according to claim 7.

10. A drive arrangement for the reciprocating drive of a cutter bar, comprising:

a hydraulic gear motor with a housing and two gearwheels located in the housing, in which the gearwheels intermesh and are set into rotation in opposite directions by a hydraulic medium running along outsides of the gearwheels from an inlet to an outlet of the housing, while only a limited or no amount of the hydraulic medium flows through an area where the gearwheels intermesh, such that one of the gearwheels is set in motion around a first axis by the hydraulic medium, and an eccentric drive connected to the gear motor to be driven thereby, the eccentric drive comprising an eccentric element that is rotatably driven by one of the gearwheels around a second axis parallel to the first axis and a drive element connected to the eccentric element, which is, or can be, drivingly connected to the cutter bar;

wherein the eccentric element is connected via a planetary gear to one of the gearwheels.

11. The drive arrangement according to claim 10, wherein the planetary gear comprises a ring gear directly connected to one of the gearwheels, a fixed sun wheel connected to the housing and a planet carrier supporting planetary gears, the planet carrier being connected to the eccentric element.

* * * * *